April 8, 1969
W. H. WARREN
3,437,096
EGG TRANSFERRING DEVICE
Filed Feb. 13, 1967
Sheet 1 of 5
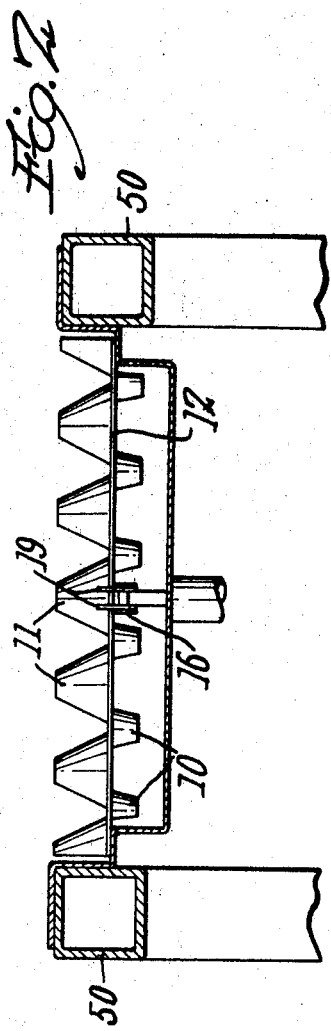
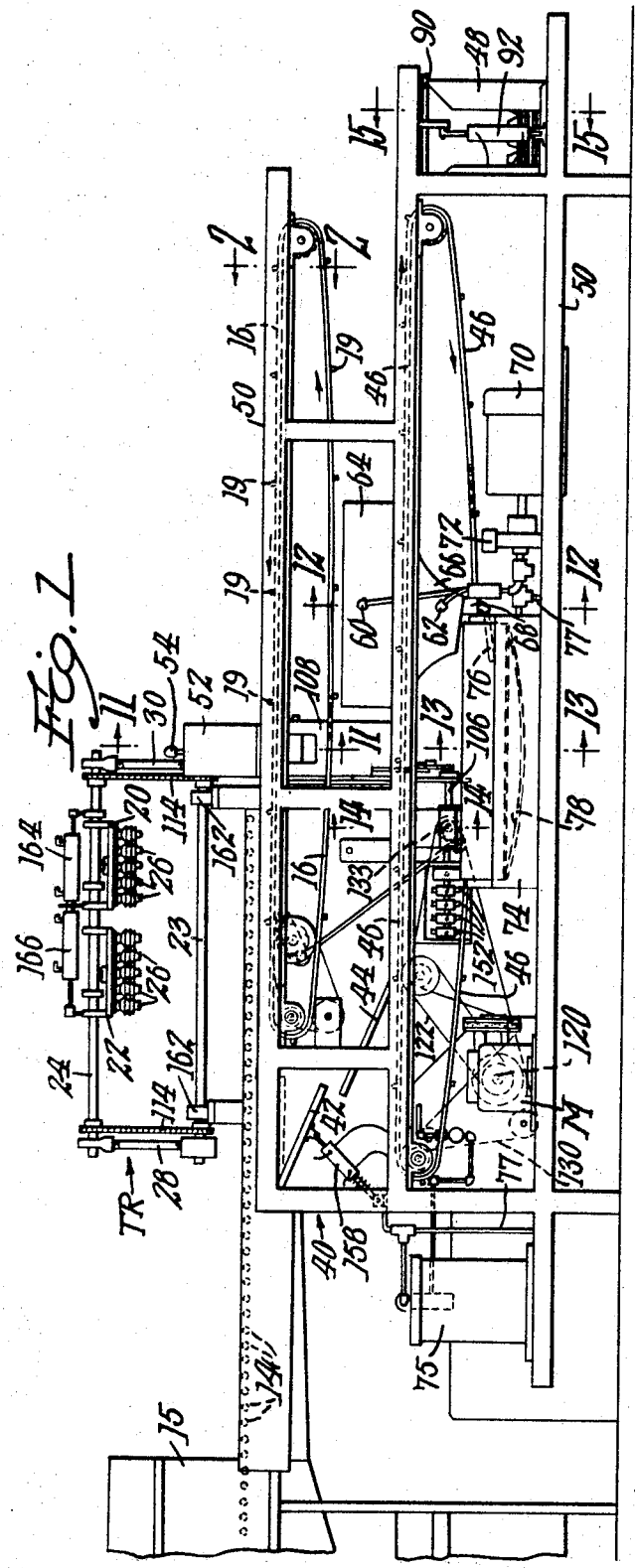
Inventor
William H. Warren
By Charles R. Fay,
Attorney

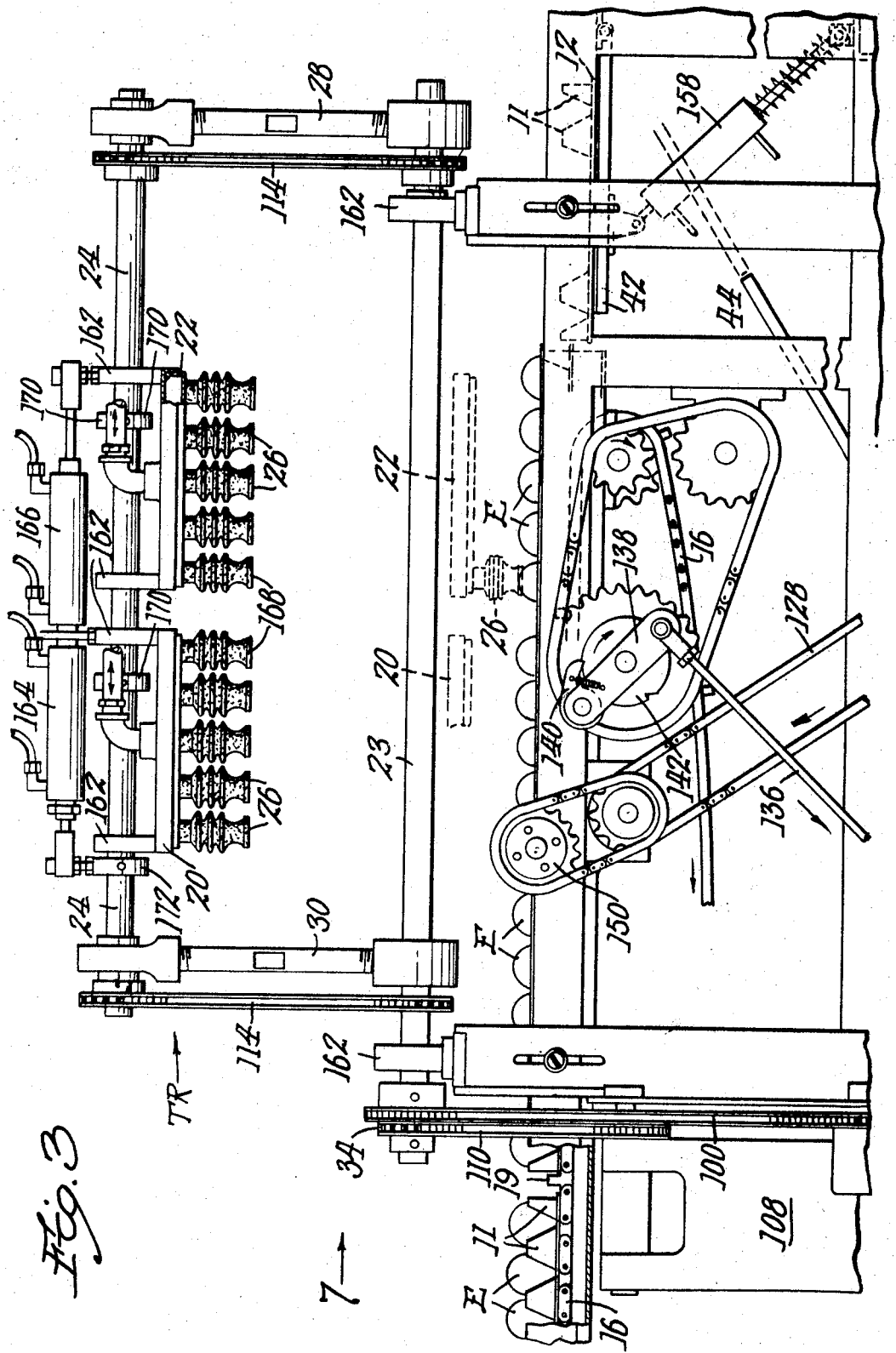

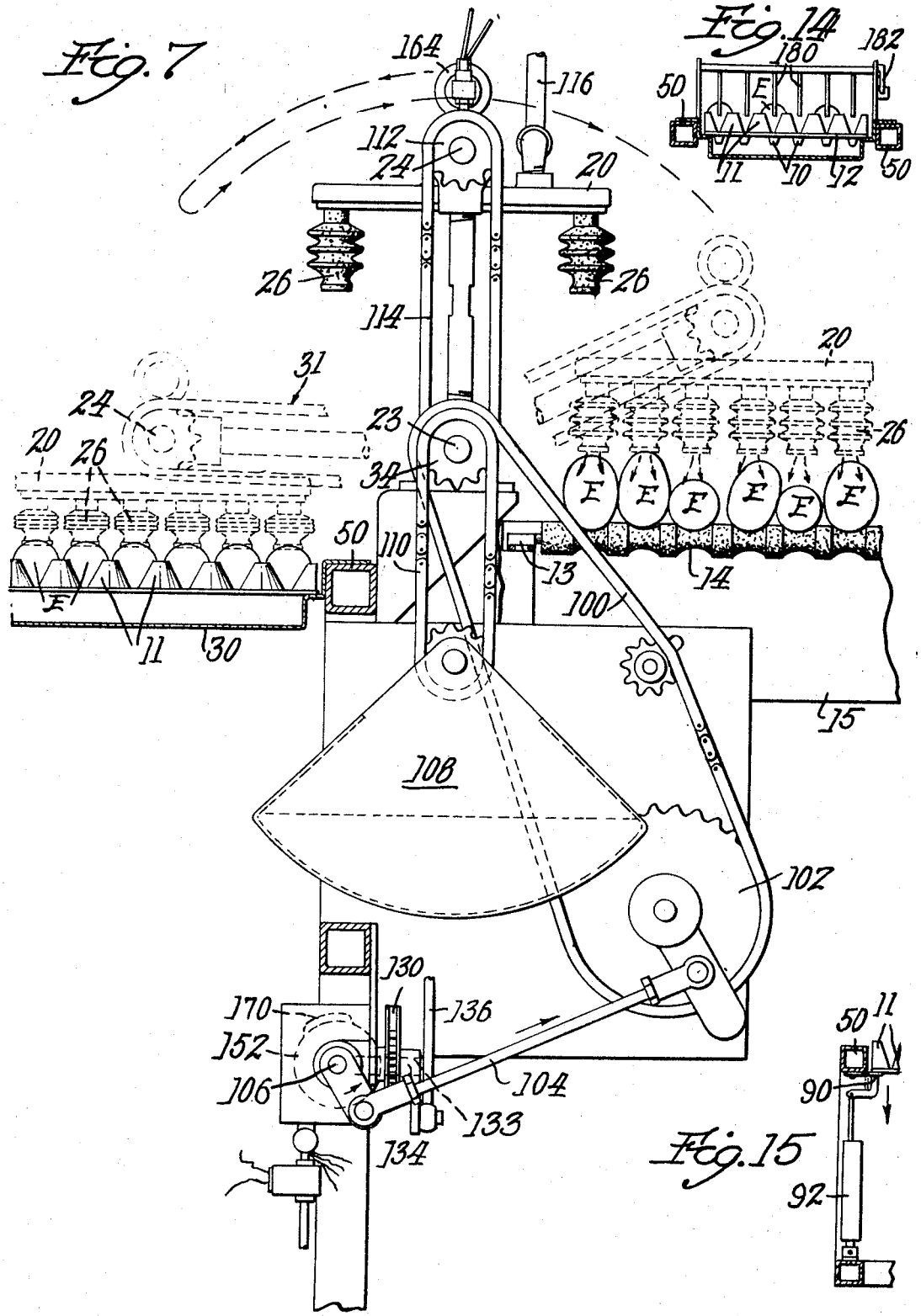

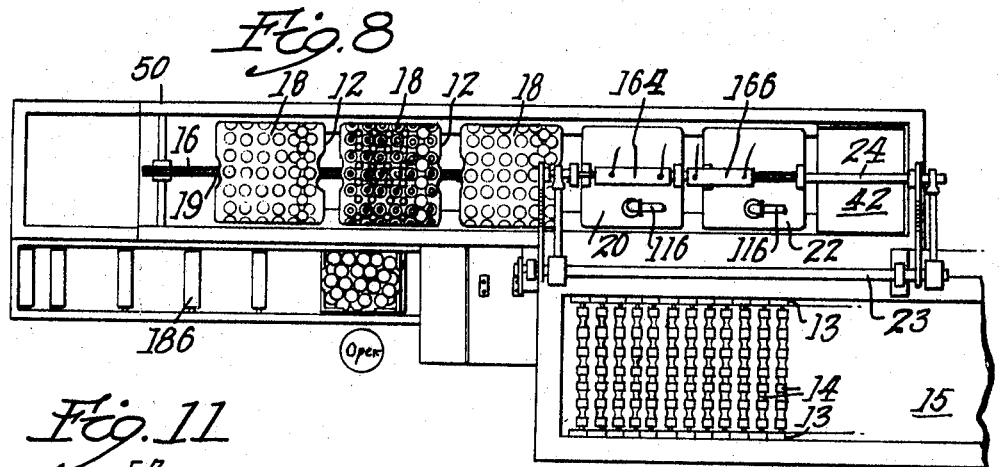
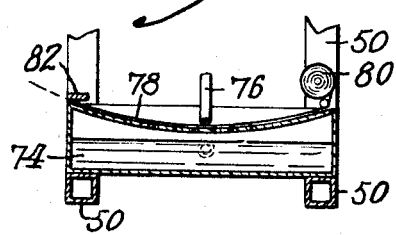
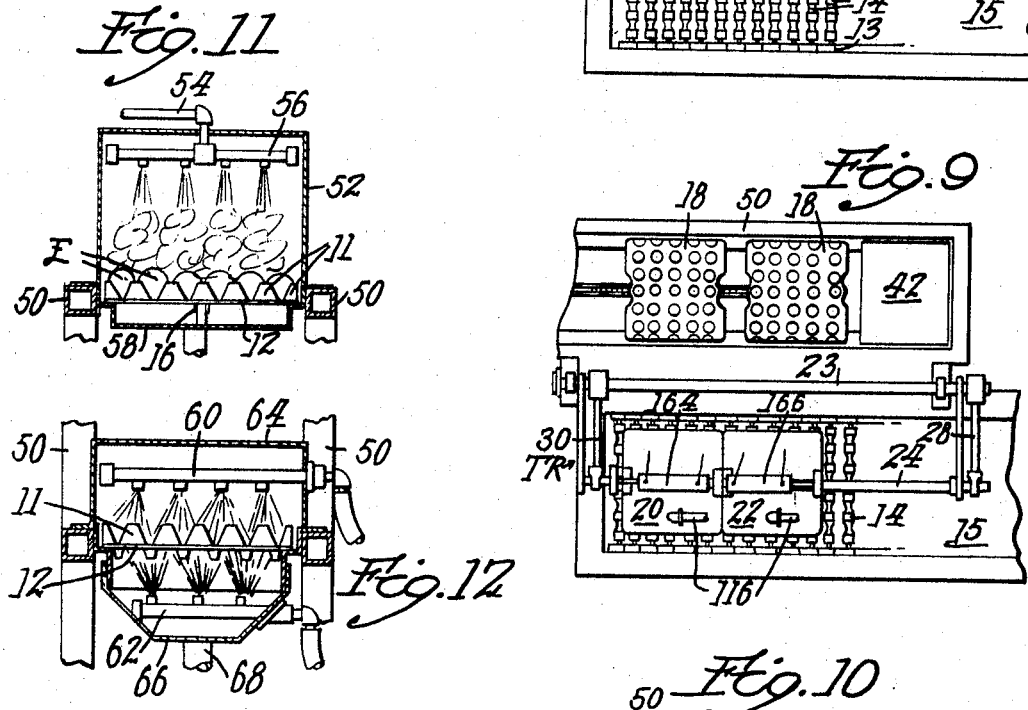
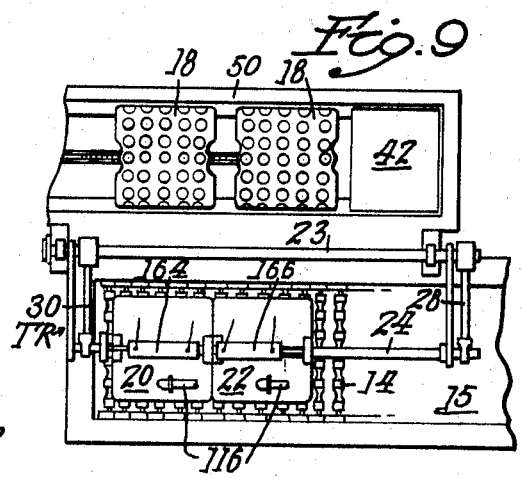
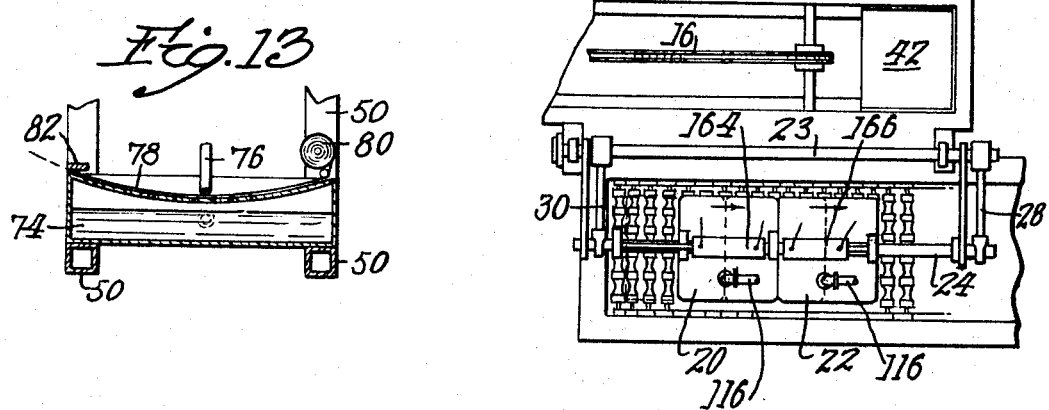

United States Patent Office 3,437,096
Patented Apr. 8, 1969

3,437,096
EGG TRANSFERRING DEVICE
William H. Warren, Pleasant St., West
Brookfield, Mass. 01585
Filed Feb. 13, 1967, Ser. No. 615,692
Int. Cl. B65b 23/06; B08b 3/02
U.S. Cl. 134—104      7 Claims

ABSTRACT OF THE DISCLOSURE

Automatically arranging eggs to be fed into an egg washing machine or the like and comprising a transfer mechanism utilizing a pair of egg lifters used in conjunction with eggs on conventional egg trays advancing on a conveyor, lifting the eggs from two trays in separated groups, bringing the groups together so that the eggs are arranged in a series of equally distant spaced rows, moving the egg lifters to a position over the conveyor leading into the egg washer and depositing the eggs in a single group onto said conveyor, so that the egg washing machine receives a full complement of eggs automatically without blanks in the array of eggs being fed into the washer.

---

This invention relates to a new and improved egg transferring device in which eggs are placed in a conveyor in the usual egg trays which are traveled to a transfer point where they are removed from the trays by pairs of trays, the two groups of eggs being relatively moved toward each other so as to provide a single group of eggs which are in equally mutually spaced linear relationship for application to a conveyor in an egg washer or other egg processing device, wherein the egg washer conveyor accepts only eggs in such a linear relationship; in combination with means for processing the trays after the eggs have been removed therefrom, by the transfer mechanism, to a point where said trays are cleaned and thereafter stacked ready for reuse.

The egg transfer mechanism of the present invention handles thousands of eggs an hour and requires only that an operator place trays of eggs one by one at the intake side of the machine, and to remove the cleaned, stacked empty trays from the machine. The machine transfers the eggs and rearranges their relative positioning so that the subsequent egg processing machine can properly accept the same, cleans the trays, and returns the trays to a stacked condition ready for reuse.

In modern day handling of eggs and similar objects, certain machines can be designed to handle the same at high rates of speed or in great volume, but this means that such machines must be supplied with the articles such as the eggs in volume at or near the capacity of the processing machine in order to make the same economically feasible. Eggs are collected and put in trays in certain numbers of lines of eggs but even when these trays are set close together, there is always a greater width between adjacent lines of eggs in contiguous trays than between lines of eggs within a tray. On the other hand, the processing machines, e.g., the washer in the present case, is designed to accept eggs only in one line after another in equally spaced relationship. Therefore it is an object of the present invention to not only supply the eggs to the egg processing machine, e.g., a washer, at or near the capacity of the washer, but also to apply them to the same as demanded by the processing machine conveyor, with a minimum of loss or malfunction.

Reference is to be had to the accompanying drawings in which:

FIG. 1 is a view in side elevation illustrating the machine;

FIG. 2 is a sectional view on an enlarged scale on line 2—2 of FIG. 1;

FIGS. 3 and 4 are views in elevation on an enlarged scale at the opposite side of the machine from the observer in FIG. 1; FIGS. 3 and 4 being correlated;

FIG. 7 is an elevational view illustrating the action of the egg transfer device looking in the direction of the arrow in FIG. 3;

FIG. 8 is a plan view on a reduced scale illustrating the transfer device and the egg rolls for the egg processing machine;

FIG. 9 is a view similar to FIG. 8 with parts omitted and illustrating the action of the transfer mechanism;

FIG. 10 is a view similar to FIG. 9 further illustrating the action of the egg transfer mechanism, and FIGS. 11 through 15 are sectional views taken on the respective lines in FIG. 1.

Figure 5:
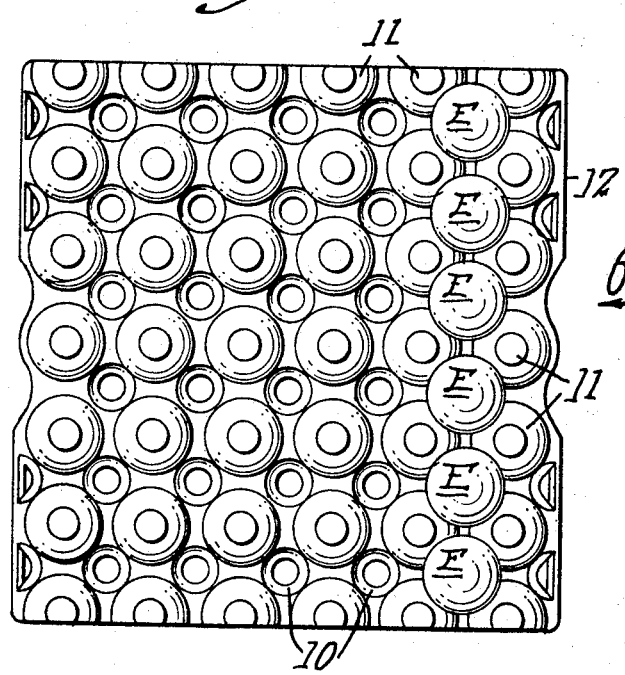
FIG. 5 is a plan view of one of the egg trays.
Figure 6:
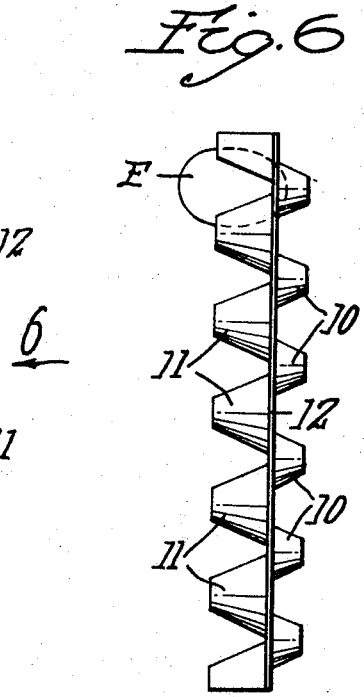
FIG. 6 is a side view in elevation looking in the direction of the arrow 6 in FIG. 5.

In order to describe and properly explain the present invention it is necessary to first briefly describe egg carrying trays such as are shown in FIGS. 5 and 6. These are usually made of pulp or plastic and they contain conical depressions which are for instance indicated at say 10, 10 in FIGS. 5 and 6, these trays shown holding thirty eggs E in six rows of five each. These depressions usually have drain holes in the bottoms thereof. The eggs are also divided and protected by upstanding cones 11. However when two trays are placed together along their edges as at 12, the adjacent rows of eggs in the contiguous trays are spaced apart a distance greater than the rows of eggs in the body of each tray.

When the eggs are placed in the feed-in conveyor, see 13, FIG. 7, for the processing machine, they are placed on rollers which are carried on chains indicated at 14, these rollers being equally spaced.

The egg processing machine as at 15 has a high capacity, but it takes too many operators to load eggs to capacity on the rollers, and the eggs are not loaded to the full capacity of the rollers. This invention provides means for automatically supplying the conveyor rollers at 14 with a full complement of eggs at all times, and to this end the egg trays, full of eggs and as they come from the nests, are set one by one by the operator on the conveyor which is indicated at 16 in FIGS. 1 and 8, and it will be seen from FIG. 8 that the trays themselves indicated at 18 are spaced. This is because the conveyor at 16 has lugs 19 for pushing the individual egg trays along in the direction of the arrows toward the transfer mechanism which is generally labeled TR.

The transfer mechanism itself comprises a pair of vacuum type egg lifters or frames 20, 22 each including an air chamber. These egg lifters are separate but slidably mounted on a rod 24 and are provided with resilient rubber egg chucks 26 for lifting the eggs, there being a chuck on each lifter for each egg in each tray, i.e., thirty such chucks on each of the lifters 20 and 22.

The rod 24 is mounted for oscillatory action on a pair of power operated end rods 28 and 30 connected to shaft 23, see particularly FIG. 7 where the eggs are shown moving from the transfer device to the egg holding rollers 14 for the egg processing device. As shown, the rods 28 and 30 move say for instance in a counterclockwise direction in FIG. 7 to a point where the chucks pick up the eggs from a pair of trays, i.e., each egg lifter 20 and 22 picks up, e.g., thirty eggs from separate and spaced egg trays. When the eggs are held, as by suction, to the egg chucks 26, which can be supplied with a negative pressure, the rods 28 and 30 are swung in a counterclockwise direction as by a sprocket 34 properly driven by means to be hereinafter described through approximately 180° to a point where the eggs are placed over the depressions in the rollers 14 as clearly shown in FIG. 7, whereupon the negative pressure in the chucks is replaced by a positive pressure which ejects the eggs onto the rollers, there being as it will be seen an egg for each depression in a contiguous pair of rollers 14.

However between the left-hand position over the conveyor in the area 31 in FIG. 7 and the rollers 14, the two egg lifters 20 and 22 are brought together as is diagrammatically shown as for instance in FIGS. 8, 9 and 10, so that during the motion of the rods 28 and 30 from their leftward position to their rightward position, FIG. 7, the two sets of eggs and the two lifters are brought together so that the adjacent rows in the now contiguous egg lifters 20 and 22 are spaced apart the same as are the rows of eggs within the body portions of the lifters (or trays) themselves.

This action will cause the eggs to be arranged so as to be ejected upon the rollers 14 as above described, the eggs coinciding with the pairs of depressions in adjacent rollers. At the time of ejection the now contiguous egg lifters are moved in the direction of the motion of the rollers 14 as pulled by chain 13 and at the same speed as is illustrated in FIG. 10. This is a "flying" motion to coincide with the velocity of the rollers 14, i.e., the eggs move forwardly toward the processing machine, e.g. the washer, at the rate of speed of the conveyor mounting the rolls 14, so that when the eggs are ejected, breakage is minimized, and the eggs are laid gently upon the rollers. The motion thereof is continued to the egg processing machine, e.g., washer by the rollers, the two egg lifters then being returned as shown in FIG. 7 to pick up the eggs from two more trays to repeat the action.

When the eggs have been lifted from the trays, these trays of course proceed along under the influence of the conveyor 16. At the end of the conveyor which is indicated for instance at 40, FIG. 1, they are discharged by a power driven drop leaf ramp 42 onto an incline 44 and down onto a conveyor 46 which carries them back towards the stacker at 48 whence they can be lifted in stacks to be reused for subsequent collections of eggs. The drop leaf ramp 42 is operated by a solenoid or air cylinder in timed relation to the conveyor 16. During this travel the trays are cleaned so that when they arrive at the stacker, they are ready for reuse without any further action being taken thereon.

The chain 16 and other parts of the machine are mounted on suitable framework 50, 50 and on this framework as illustrated in FIG. 1, there may be applied a fogging device 52 perhaps best seen in FIG. 11. This device includes an enclosure through which the eggs pass under influence of the chain at 16 and at 54 a pipe leads in cleaning fluid cleaning loose detritus from the eggs while they are still in the trays, just before the transferring action, so that the egg chucks can better hold them. This makes malfunctions of the egg lifter chucks extremely unlikely. The pipe 54 leads to a spray arrangement illustrated at 56 in FIG. 11 together with a drain 58, etc. to drain the condensed cleaning fluid to a reservoir or the like.

Referring now to FIG. 12 there is shown the tray cleaner which comprises upper and lower nozzles containing water or cleaning fluid under pressure, these being illustrated at 60 and 62 being located in a suitable housing 64 with drain-box 66, drain 68, tank for reuse, etc., together with appropriate motor and pump as illustrated at 70, 72 in FIG. 1. This cleaning fluid, detergent, etc. may be kept in a self-contained tank 74 or the like to be led to the nozzles at 60 and 62 and receiving the drain therefrom for reuse thereof. The tank 74 is replenished from a tank 75, through a line 77 having a main solenoid operated shutoff valve which closes upon shutting down the main drive motor M.

In order to maintain this material clean and reusable at all times, the drain 68 may lead to a pipe 76 discharging the return cleaning material onto a commercial filter paper 78 which is arranged to be provided from a roll 80 at one side of the framework. When this filter becomes dirty, the operator draws it through toward the left in FIG. 13 and cuts it off on a knife edge 82 presenting a new stretch of filter paper to the drain.

When the trays reach the stack, they are momentarily supported on a pair of arms 90 in horizontal condition but the trays then are allowed to descend maintaining their horizontal position by reason of the fact that these arms swing down under influence of an air cylinder 92 which is tripped in timed relation to the flow of trays, so that the trays are stacked vertically and do not fall helterskelter into the stacker. It is to be understood that FIG. 15 shows only the left-hand side of the stacker, the opposite side being the same but reversed.

The rods 28 and 30 are provided with their motion from the gear 34, FIG. 7, which is operated by a reversing chain or the like 100 in turn operated by a gear 102 which oscillates under the action of a crank 104 operated from a shaft 106 moving at a relatively slow speed. Various adjustments are provided in order to smooth out the action of this oscillation but it will be seen that the gear 102 oscillates under action of the crank arm 104, and this in turn causes the chain 100 to move backward and forwards and to in turn oscillate the gear 34. A counterweight 108 is provided and is geared to gear 34 as by a chain 110 and this counterweights the entire weight of the egg lifters, rods 28, 30, etc., regardless of their position.

A gear 112 fixed to the shaft 24 maintains the latter in its position relative to the horizontal by means of a chain 114. That is, as the rods 28 and 30 are oscillated as above described and as shown in FIG. 7, the transfer device comprising the lifters as for instance 20 and 22 are maintained horizontal by the shaft 24 under control of the gear 112. Vacuum and pressure is provided to the lifters 20 and 22 by any convenient means such as hoses 116 and the power therefor is derived from a suitable pump motor, etc.

Figure 4:
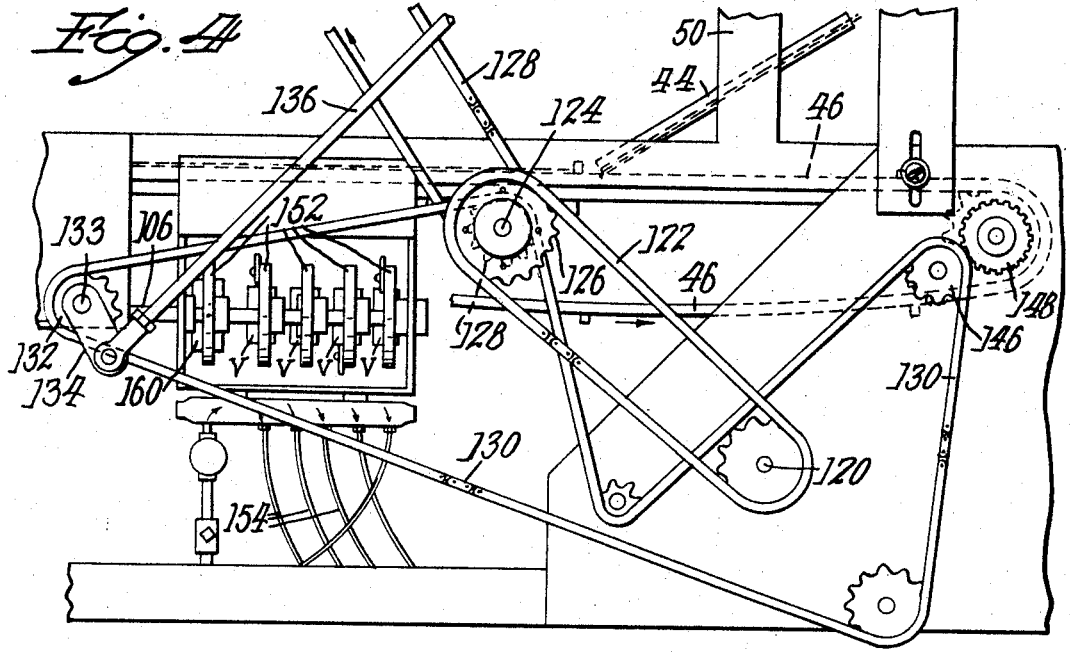

The main drive motor M is connected to drive a shaft 120 in turn driving a belt or chain 122 which drives a shaft 124 (FIG. 4) containing a ball-type slip mechanism for maintaining the timing between the conveyors and especially between the operation of the conveyors 13 and 16. The sprocket 126 drives another sprocket 128 on the shaft 124 which in turn drives the chain 130. This in turn drives a sprocket 132 rotating crank 134 to actuate crank rod 136. The sprocket 132 is mounted on a shaft 133 which through a gear reduction turns shaft 106 one for two turns of shaft 133.

The crank rod 136 oscillates the link 138 by means of the pawl 140 (FIG. 3) and this intermittently rotates a drum or pulley 142 which is utilized to drive the chain 16 in an intermittent or step-by-step relation so as to provide a time interval for the advance of the trays between the oscillations of the lifters 20 and 22 between the extreme positions shown in FIG. 7.

An appropriate reversal chain is utilized to drive the conveyor 46 in a direction opposite to the conveyor 16 as by sprockets 146 and 148.

The chain 128 also operates a washer timing device 150, see FIG. 3, and it is pointed out that these timing devices as at 126 and 150 are commercial devices, the details of which form no part of the present invention.

Represented at 152 are a series of rotating cams rotated through bevel gears not shown from shaft 106 and controlling valves V, V operating fluid devices through the hoses 154 and controlling the various cylinders, etc. which are utilized to actuate moving parts in timed relation. The tray depositing device 42 is provided with a cylinder 158 controlled by one of these valves. The shaft which drives the cams also drives another cam which intermittently actuates a microswitch at 160. This switch controls the timing of the suction and the pressure applied through the connections 116 to the egg chucks 26.

The rod 24 slidingly supports the egg lifters 20 and 22 as on bearings 162 and it will be seen looking at FIG. 3 that these egg lifters can slide right to left as required. This action is provided by air cylinders 164 and 166 controlled by appropriate cams 152 so that as the eggs are being lifter from the left-hand position in FIG. 7 upwardly, egg lifter 22 slides toward and contacts egg lifter 20 so as to bring the adjacent rows of eggs as at 168 close together as explained above. This action can be provided with limit stops or the like 170. As the two now contiguous egg lifters descend toward the right-hand ejection position, FIG. 7, both lifters are then moved toward the right in FIGS. 3 and 10, (left in FIG. 1) to provide the flying action of the eggs needed to conform the speed of the conveyor 16 and rolls 14 for the processing machine, e.g., the washer. The two air cylinders 164 and 166 are provided with a reaction point by a connection at 172 to the rod 24.

Referring now to FIG. 14 and to its location in FIG. 1 in the area of the upper run of the conveyor 46 which is moving to the right in FIG. 1, it will be seen that there are provided a series of feeler fingers 180, one for each egg-receiving member 10. This device is to indicate whether or not there is an egg or eggs still left in the tray as it passes toward the front of the machine on conveyor 46. This is desired to be done prior to the washing apparatus for the trays at 60 and 62. The feelers energize a buzzer signal or the like at 182 to apprise the operator that there is an egg or eggs present which have to be removed and reapplied.

It is believed that the operation of this machine will be clear from the foregoing description. The trays are placed on the conveyor 16 which moves to the left in FIG. 1 and these trays are then urged along as for instance by the spaced lugs 19 in an intermittent action until they reach the egg lifting station. See the numerals 184, 186 in FIG. 8 which indicate the relative positions of the lifters 20 and 22 at the time when the egg chucks assume the dotted line relationship at their left-hand position shown in FIG. 7.

The microswitch at 160 is operated in order to provide a vacuum in the chucks through the appropriate hoses 116 as explained, and the eggs are thereby attached to the chucks, whereupon the timing mechanism causes the frame including the rods 28 and 30 to move as described to the right-hand position shown in FIG. 7 and also in FIGS. 9 and 10, whereupon the two now touching egg-lifting devices are moved to the right in the directions of the arrows in FIG. 10. The microswitch aforesaid being again de-energized, pressure is provided in the chucks and the eggs are ejected.

It may happen that an egg is too dirty to be lifted by a chuck in which case of course it stays in its tray as the tray continues to move to the left in FIG. 1 to the position of the dump member 42. The latter is held in horizontal position by its cylinder 158 until such time as its appropriate cam is turned to energize the cylinder to bring member 42 down into alignment with the inclined ramp 44, whereupon the tray slides down onto conveyor 46 moving to the right in FIG. 1. In this way any eggs still in the tray will not be taken and will be detected by the fingers 180 so that the operator can remove them prior to the cleaning of the trays at 60 and 62. The vacuum in the egg chucks is sufficient to hold all of the other eggs, although one or more should not become attached.

The eggs thereupon proceed in unbroken ranks to the processing machine 15, e.g., washer, and the trays proceed to the right in FIG. 1 to the stacker, the operation of which has already been described. When the stacker 48 is full or when the operator needs them, he merely releases the trays from the stacker and returns them for reuse for carrying the eggs.

As shown in FIG. 8 there is a roller table or the like indicated at 186 upon which the trays of eggs may be manually provided and the operator may stand where shown in this figure to place the trays on the conveyor 16.

It has been discovered that the lifters should proceed faster than the second conveyor 15, i.e., at delivery, because of the shape of the eggs. Thus if an egg tends to fall back, it gets crushed but if the speed of the lifter is increased the egg tends to drop where desired by rolling forwardly on conveyor 15.

Having thus described my invention and the advantages thereof, I do not wish to be limited to the details herein disclosed, otherwise than as set forth in the claims, but what I claim is:

1. An article transferring apparatus wherein articles proceed on a first conveyor of one type to a predetermined point, and are then lifted from said first conveyor and transferred to a second conveyor of a different type, the articles being arranged in a predetermined manner on the first conveyor, and in a different manner on the second conveyor, comprising an article lifter, means to transfer the lifter along a predetermined path of motion from a first position over a number of articles on the first conveyor to a predetermined second position over the second conveyor, means on said lifter for securing the articles thereto at the first position and means causing ejection of said articles at said second position, means on the transfer means for actuating said article lifter to rearrange the articles from their original, arrangement to a different arrangement, the lifter accepting the articles as at the first station and delivering them in the different arrangement for proper acceptance at the second station, and means to move the article lifter in the direction of motion of the second conveyor and at a compatible speed with respect thereto at the interval of discharge of the articles onto the second conveyor.

2. The apparatus of claim 1 wherein the means to move the article lifter in the direction of motion of the second conveyor operates at a faster speed with respect thereto at the interval of discharge of the articles onto the second conveyor.

3. The apparatus of claim 1 wherein the article lifter comprises at least two separate frames, each frame having a plurality of article holding chucks thereon, said transfer means for said article lifter operating generally in a plane transverse to the first conveyor, and means moving both frames together generally parallel to said second conveyor at the interval of discharge of the articles, the means moving the frames also separating the frame prior to arrival at the first position and then bringing them together during the transfer from the first position to the second position.

4. The apparatus of claim 1 including means on the first conveyor to carry trays thereon, the articles being in the trays, means to redirect the empty trays after passing the first position to return to a starting position, and means to wash the empty trays during the interval of return.

5. Apparatus of the class described comprising a first tray conveyor, means on the conveyor accepting trays of articles to carry the trays in a predetermined direction, intermittently acting transfer means removing the articles from the trays, means transferring the trays one by one onto a second tray conveyor running in a reverse direction, cleaning means for said trays associated with said second tray conveyor so that the trays are cleaned after the articles have been removed therefrom, and stacking means at the terminus of said second tray conveyor so that the clean trays are stacked one upon another ready for reuse.

6. The apparatus of claim 5 including power operated means for the tray transferring means operating the same in timed relationship with respect to said conveyors and the transfer means, said tray transfer means comprising a dumping member which is normally held in horizontal position receiving the trays from said first conveyor, and means periodically inclining said dumping member so that the trays slide therefrom onto said second conveyor, whereby any articles accidentally remaining in said tray will not fall from the tray or be damaged.

7. The apparatus recited in claim 5 wherein said cleaning means includes a plurality of nozzles and fluid under pressure for the nozzles for spraying said trays, a drain for said fluid, a reservoir receiving fluid from the drain, a filter in the reservoir receiving the fluid from the drain, a magazine for supply of the filter whereby the operator of the machine may easily withdraw a section of filter over the reservoir, thus drawing a clean section of filter into operative position relative to the drain and the reservoir.

References Cited

UNITED STATES PATENTS 3,272,360  9/1966  Vanderschoot _____ 214—309

FOREIGN PATENTS 890,102  2/1962  Great Britain.

GERALD M. FORLENZA, *Primary Examiner.*

GEORGE F. ABRAHAM, *Assistant Examiner.*

U.S. Cl. X.R.

134—127, 131; 214—309, 1; 294—87